United States Patent [19]
Inoue et al.

[11] Patent Number: 6,132,333
[45] Date of Patent: Oct. 17, 2000

[54] FAILSAFE TOROIDAL CONTINUOUSLY VARIABLE TRANSMISSION

[75] Inventors: Eiji Inoue; Atsushi Yamazaki, both of Kanagawa, Japan

[73] Assignee: Isuzu Motors Limited, Tokyo, Japan

[21] Appl. No.: 09/194,542

[22] PCT Filed: Mar. 31, 1998

[86] PCT No.: PCT/JP98/01483
§ 371 Date: Nov. 30, 1998
§ 102(e) Date: Nov. 30, 1998

[87] PCT Pub. No.: WO98/44279
PCT Pub. Date: Oct. 8, 1998

[30] Foreign Application Priority Data

Mar. 31, 1997 [JP] Japan ........................... 9-94519
Mar. 31, 1997 [JP] Japan ........................... 9-94521

[51] Int. Cl.$^7$ .................................................. F16H 61/12
[52] U.S. Cl. .............................................. 477/37; 477/906
[58] Field of Search ........................ 477/37, 906; 476/10, 476/36

[56] References Cited

U.S. PATENT DOCUMENTS

| | | | |
|---|---|---|---|
| 5,575,732 | 11/1996 | Inoue | 476/10 |
| 5,681,236 | 10/1997 | Inoue | 476/10 |
| 5,711,741 | 1/1998 | Inoue | 476/10 |
| 5,779,591 | 7/1998 | Inoue | 476/10 X |
| 5,842,945 | 12/1998 | Inoue | 475/211 X |

FOREIGN PATENT DOCUMENTS

| | | |
|---|---|---|
| 62-020945 | 1/1987 | Japan . |
| 7-151218 | 6/1995 | Japan . |
| 8-233083 | 9/1996 | Japan . |
| 8-233093 | 9/1996 | Japan . |
| 9-079369 | 3/1997 | Japan . |

*Primary Examiner*—Khoi Q. Ta
*Attorney, Agent, or Firm*—Browdy and Neimark

[57] ABSTRACT

When the solenoid valves constituting the transmission ratio control valve should fail electrically, the toroidal continuously variable transmission shifts the transmission ratio toward the speed increasing side to avoid possible dangers of a car while traveling and at the same time cancels variations of the spool valve movement caused by the control oil pressures of the solenoid valve. The two solenoid valves that control the oil pressures acting on the both ends of the transmission ratio control valve having a spool valve are of opposite types, a normally open type and a normally closed type. The duty A and duty B for these solenoid valves are set to equal values (S11). Even when any of the solenoid valves are electrically failed, the transmission ratio of the toroidal speed change unit in the toroidal continuously variable transmission is shifted toward the speed increasing side, which is a safe side for the running car. The duty signal for one of the solenoid valves is output through a timer count (S13) so that it is 180 degrees out of phase with the duty signal for the other solenoid valve (S14). Hence, variations of the spool valve movement caused by the control oil pressures acting on the both ends of the transmission ratio control valve can be offset.

12 Claims, 9 Drawing Sheets

FAILSAFE TOROIDAL CONTINUOUSLY VARIABLE TRANSMISSION

TECHNICAL FIELD

The present invention relates to a toroidal continuously variable transmission that has power rollers tiltably arranged between an input disk and an output disk, both having a toroidal surface, and which continuously changes the rotation speed of the input disk and transfers the speed-changed rotation to the output disk.

BACKGROUND ART

A toroidal continuously variable transmission has been known which has a toroidal speed change unit that comprises an input disk, an output disk arranged opposite the input disk, and power rollers in frictional contact wit these disks. This toroidal continuously variable transmission continuously changes the rotation speed of the input disk by changing a tilt angle of the power rollers while transmitting the rotation of the input disk to the output disk.

Figure 6:
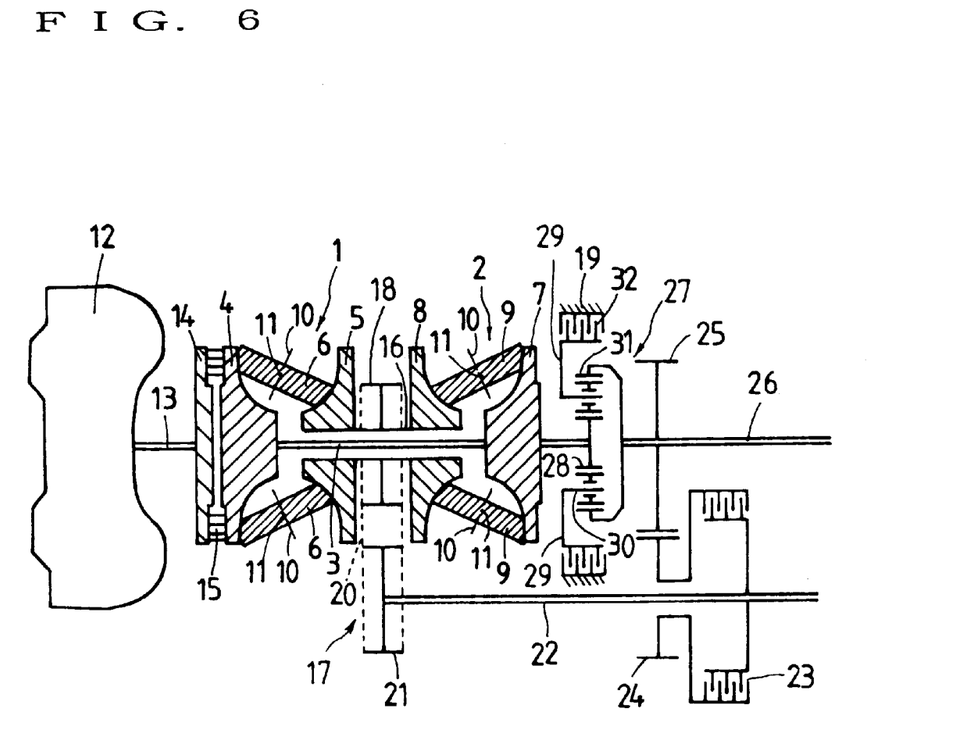
FIG. 6 is a schematic diagram showing a conventional toroidal continuously variable transmission.
Figure 7:
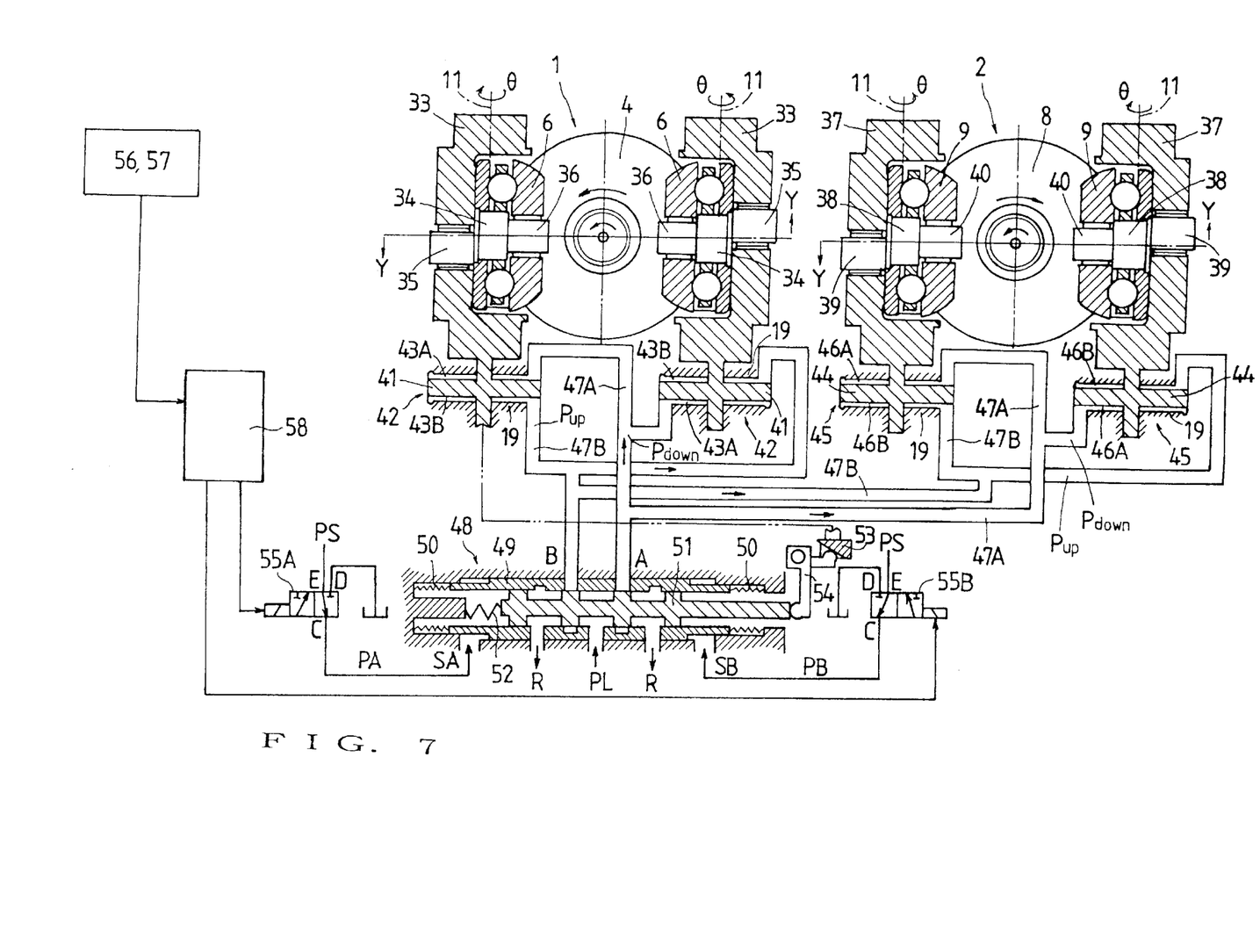
FIG. 7 is a cross section of the conventional toroidal continuously variable transmission shown in FIG. 6.
Figure 8:
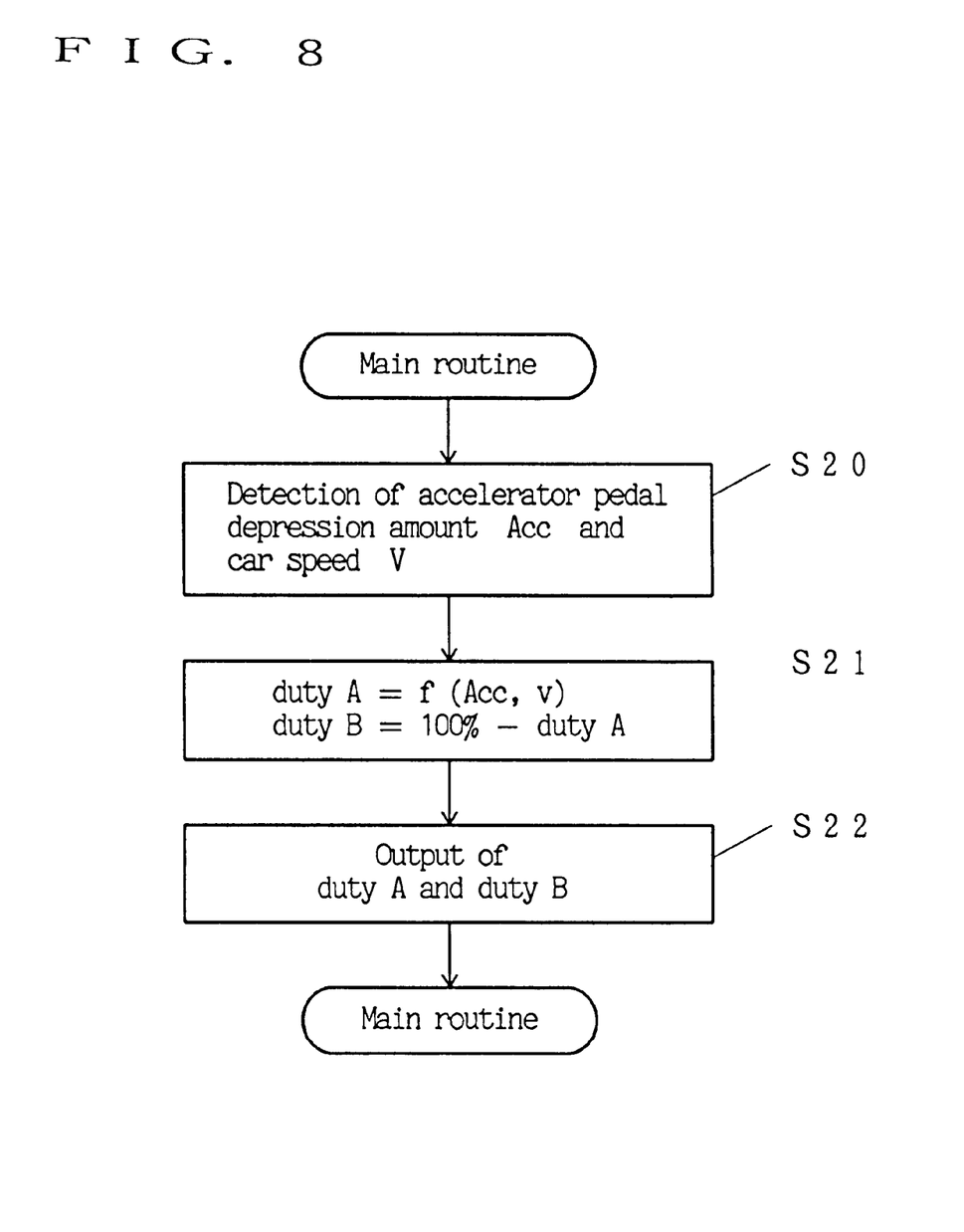
FIG. 8 is a flow chart for determining duties of solenoid valves applied to the conventional toroidal continuously variable transmission.

Among the toroidal continuously variable transmissions there are those having a plurality of toroidal speed change units mounted on the same shaft. A type of toroidal continuously variable transmission particularly with two parallelly arranged toroidal speed change units is known as a double cavity type toroidal continuously variable transmission. FIGS. 6 and 7 show one example of the conventional double cavity type toroidal continuously variable transmission. FIG. 6 is a schematic diagram of the conventional double cavity type toroidal continuously variable transmission and FIG. 7 is a cross section showing a transmission ratio control mechanism in the double cavity type toroidal continuously variable transmission of FIG. 6 that includes the toroidal speed change units and a transmission ratio control valve. FIG. 8 is a flow chart showing the procedure for determining a duty of a solenoid valve in the transmission ratio control mechanism of FIG. 7.

In the double cavity type toroidal continuously variable transmission shown in FIG. 6, two toroidal speed change units 1, 2 are mounted side by side on a main shaft 3. The toroidal speed change unit 1 comprises an input disk 4, an output disk 5 disposed opposite the input disk 4, and power rollers 6 in frictional engagement with toroidal surfaces of the disks 4, 5. The toroidal speed change unit 2, like the toroidal speed change unit 1, comprises an input disk 7, an output disk 8 disposed opposite the input disk 7, and power rollers 9 in frictional engagement with toroidal surfaces of the disks 7, 8. The toroidal speed change units 1, 2 each have two sets of power rollers 6, 9. The power rollers 6, 9 each can be rotated on their own rotation axis 10 and tilted about a tilt axis 11 (perpendicular to the sheet of the drawing) crossing the rotation axis 10 at right angles.

In the toroidal speed change units 1, 2, the input disks 4, 7 are displaceable in the axial direction of the main shaft 3 and rotatable together with the main shaft 3. The driving force of the engine is supplied through a torque converter 12 to an input shaft 13 laid on the same axis as the main shaft 3. At the front end of the input shaft 13 there is provided a loading cam 14 with a cam roller 15. The rotation of the loading cam 14 causes the input disk 4 and, through the main shaft 3, the input disk 7 to rotate. Thus, the main shaft 3 functions as an input shaft for the input disks 4, 7. The cam action of the loading cam 14 generates a thrust force (in the axial direction of the main shaft 3) pressing the input disks 4, 7 against the power rollers 6, 9 according to the magnitude of the input torque. The thrust force holds the power rollers 6, 9 between the input disks 4, 7 and the output disks 5, 8 according to the magnitude of the torque being transmitted. The rotation of the input disks 4, 7 is transmitted to the output disks 5, 8 through the power rollers 6, 9 based on the oil shearing force.

In each of the toroidal speed change units 1, 2, the power rollers 6, 9 are tiltable about the tilt axes 11, and the rotation of the input disks 4, 7 while being transmitted to the output disks 5, 8 is continuously changed in speed according to the tilt angle of the power rollers 6, 9. The power rollers 6, 9 are supported rotatable and pivotable relative to trunnions 33, 37 (see FIG. 7) so that they can be pivoted corresponding to their displacement in the axial direction of the main shaft 3 caused by the thrust force.

The output disks 5,8 are coupled back to back on a coupling shaft 16 as by spline so that they can rotate together. The coupling shaft 16 is a hollow shaft mounted relatively rotatable on the main shaft 3. A sprocket 18 is formed integral with an intermediate portion of the hollow shaft. The coupling shaft 16 is connected to an output shaft 26 as described later. The output disks 5, 8 are supported on the casing 19 by bearings (not shown) that support thrust and radial loads through the coupling shaft 16. The driving force transmitted to the output disks 5, 8 is further transferred through a chain transmission device 17 as a first transmission means, which includes the sprocket 18, a chain 20 and an intermediate sprocket 21, and then to a countershaft 22 having the intermediate sprocket 21 at one end thereof.

At the other end of the countershaft 22 is mounted a forward clutch 23, whose output side is connected to a first gear 24 which in turn is in mesh with a second gear 25 secured to the output shaft 26 of the entire transmission. Hence, the forward clutch 23 can switch the countershaft22 and the first gear 24 between an idling state and a torque transmitting state. The first gear 24 and the second gear 25 form a reverse transmission means that reverses the rotation of the countershaft 22 and transmits it to the output shaft 26. The mechanism ranging from the chain transmission device 17 as the first transmission means to the countershaft 22 to the first and second gears 24, 25 as a second transmission means forms a reverse transmission mechanism that reverses the rotation of the output disks 5, 8 and transfers it to the output shaft 26.

Between the main shaft 3 and the output shaft 26 is arranged a planetary gear mechanism 27, which comprises a sun gear 28 secured to the main shaft 3, pinions 30 meshing with the sun gear 28 and having a carrier 29, and a ring gear 31 meshing with the pinions 30 and secured to the output shaft 26. Between the carrier 29 and the casing 19 is installed a reverse clutch 32 that switches the carrier 29 between an idling state and a fixed state with respect to the casing 19.

Next, referring to FIGS. 7 and 8, the speed change control as performed by the toroidal speed change units 1, 2 will be described. The power rollers 6, 9 are rotatably supported on the trunnions 33, 37 by rotary support shafts 34, 38. The trunnions 33, 37 have tilt axes 11 and can be moved in the axial direction of the tilt axes 11 and pivoted about the tilt axes 11. That is, as the power rollers 6, 9 tilt, the tilt angle displacements θ of the power rollers 6, 9 result directly in rotary displacements of the trunnions 33, 37 about the tilt axes 11.

The input disks 4, 7 and the output disks 5, 8 are elastically deformed in the axial direction of the main shaft 3 by the thrust. Because the axial positional references of the toroidal speed change units 1, 2 are determined by the casing 19 on which the output disks 5, 8 are supported by the bearings (not shown), the power rollers 6, 9 are displaced in the axial direction of the main shaft 3 according to the elastic deformations of the disks. The rotary support shafts 34, 38 that rotatably support the power rollers 6, 9 on their end portions 36, 40 are offset from pivotable support shafts 35, 39 pivotably supported on the trunnions 33, 37, so that the displacements of the power rollers 6, 9 in the axial direction of the main shaft 3 are absorbed by the precess motions of the power rollers 6, 9 about the pivotable support shafts 35, 39. When the positions in the thrust direction of the output disks 5, 8 are determined with respect to the casing 19, the positions of the power rollers 6, 9 are determined and the positions in the thrust direction of the input disks 4, 7 are also determined.

The structures of hydraulic cylinders 42, 45 to displace the trunnions 33, 37 in the tilt axis direction are basically identical, and their identical constitutional elements are assigned like reference numerals. The tilt axes 11 of the trunnions 33, 37 are provided with pistons 41, 44 respectively. The piston 41 is slidably installed in the hydraulic cylinder 42 formed in the casing 19. The hydraulic cylinder 42 is partitioned by the piston 41 to form therein a speed reduction side cylinder chamber 43A and a speed increasing side cylinder chamber 43B. When a pressure difference occurs between the speed reduction side cylinder chamber 43A and the speed increasing side cylinder chamber 43B in the hydraulic cylinder 42, the trunnions 33, 37 move together with the power rollers 6 in the tilt axis direction. When oil pressure is supplied to the speed increasing side cylinder chamber 43B, the speed is changed toward the speed increasing side. When oil pressure is supplied to the speed reduction side cylinder chamber 43A, the speed is changed toward the speed reduction side. Oil paths 47A, 47B in the toroidal speed change unit 2, as in the toroidal speed change unit 1, communicate to the hydraulic cylinders 45 each having the corresponding speed reduction side cylinder chamber 46A, speed increasing side cylinder chamber 46B and piston 44.

In a body (valve case) of a spool valve 48 a sleeve 49 is slidably installed. First springs 50 engaging the ends of the sleeve 49 urge the sleeve 49 to be held at a neutral position. Slidably installed inside the sleeve 49 is a spool 51 which is urged toward right in FIG. 7 by a second spring 52 disposed at one end of the spool 51. The other end of the spool 51 is engaged by a precess cam 53 through a lever 54. The spool valve 48 has an SA port formed at one end and an SB port at the other end, with the SA port supplied with a control oil pressure PA through a solenoid valve 55A and with the SB port supplied with a control oil pressure PB through a solenoid valve 55B. The spool valve 48 also has a PL port connected to a line pressure (oil pressure source), an A port communicating to the speed reduction side cylinder chamber 43A through the oil path 47A, a B port communicating to the speed increasing side cylinder chamber 43B through the oil path 47B, and an R port communicating to a reservoir.

This toroidal continuously variable transmission has a variety of sensors, such as a car speed sensor 56 and an accelerator depression sensor 57 for detecting the amount of depression of the accelerator pedal. Speed change information such as car speed v and accelerator depression amount Acc detected by these sensors is supplied to a controller 58. The controller 58 outputs to the solenoid valves 55A, 55B control signals corresponding to a target transmission ratio calculated based on these speed change information. The solenoid valves 55A, 55B have an output port C for outputting the control oil pressure PA, PB to the SA or SB port of the spool valve 48, a drain port D, and an oil pressure source port E communicating with the control oil pressure source (pilot oil pressure source) PS. The solenoid valves 55A, 55B are of the same type and, in the case shown, are normally open changeover valves whose output port C communicates with the oil pressure source port E when an electric failure such as wire break occurs with the solenoid valves. The solenoid valves 55A, 55B, upon receiving the control signals from the controller 58, either supply the oil pressure from the control oil pressure source PS to the SA port and SB port or release the control oil pressure from the SA port and SB port to the drain to move the sleeve 49 in the axial direction according to the target transmission ratio. The sleeve 49 is formed with communication holes corresponding to the ports PL, R, A and B and, according to the position of the spool 51, allows the ports PL and R to communicate with the port A or port B.

The front end of the tilt axis 11 of one of the trunnions 33 in the toroidal speed change unit 1 is connected to a precess cam 53. The lever 54 pivotably supported at its central part has one end thereof engaged with the precess cam 53 and the other end engaged with the other end of the spool 51 of the spool valve 48. The precess cam 53 detects a combined displacement of the tilt axis direction displacement Y and the tilt angle displacement θ of the trunnion 33. The spool 51 of the spool valve 48 is moved according to this combined displacement. The spool valve 48 and the solenoid valves 55A, 55B together form a transmission ratio control valve that receives a control signal representing a target transmission ratio from the controller 58 and a signal representing the combined displacement from the precess cam 53 and control the oil pressure of the hydraulic cylinders 42, 45.

At the neutral position where the tilt axis direction displacement Y is zero, the trunnions 33, 37 maintain the tilt angle of the power rollers 6, 9 as it is at this moment and hold the transmission ratio at a value present at that time. That is, at this neutral position, the trunnions 33, 37 are located at a position in the tilt axis direction where the rotation axes 10 of the power rollers 6, 9 cross the rotating center line of the input disks 4, 7 and output disks 5, 8. At this position, the power rollers 6, 9 are tilted through a tilt angle displacement corresponding to that transmission ratio. The spool 51 is moved following the sleeve 49 that was shifted according to the target transmission ratio and assumes the position where it closes the A port and B port.

The solenoid valves 55A, 55B may be duty solenoid valves that can change a time rate of the operated position that the valve disk can take by changing the duty ratio of a pulse current used to energize the electromagnetic coils. One example procedure of determining the duties of the solenoid valves 55A, 55B is shown in FIG. 8. According to the duty determination procedure shown in FIG. 8, the car speed v and the accelerator pedal depression amount Acc are detected by the car speed sensor 56 and the accelerator depression sensor 57 (in step 20, abbreviated S20 hereafter), and the controller 58 calculates the duties for energizing the solenoids of the solenoid valves 55A, 55B according to the target transmission ratio that was determined based on the speed change information such as car speed v and accelerator pedal depression amount Acc (S21). That is, if we let the duties for the solenoid valves 55A, 55B be duty A and duty B, respectively, they can be expressed as duty A=f (Acc, v) (f represents a function)

duty B=100%−duty A

Because the solenoid valves 55A, 55B are normally open solenoid valves of the same type, the duty A and the duty B that make up the total duty (100%) are distributed so that a pressure difference is normally produced between the SA port and the SB port. The duties thus obtained are output to the corresponding solenoid valves 55A, 55B (S22) before the program returns to the main routine.

Because the solenoid valves 55A, 55B are energized under duty A and duty B, respectively, the sleeve 49 moves until the pressure difference between the control oil pressures PA and PB supplied from the control oil pressure source PS through the solenoid valves 55A, 55B to the ports SB and SA at the ends of the spool valve 48 balances with the force of the first springs 50. The position to which the sleeve 49 has moved represents the target transmission ratio.

The transmission ratio is changed by displacing the trunnions 33, 37 from the neutral position in the axial direction of the tilt axes 11. That is, when during the rotation of the input and output disks a target transmission ratio is changed and the sleeve 49 is shifted to a different position, a relative movement occurs between the sleeve 49 and the spool 51. Depending on the amount of the relative displacement, the A port or B port communicates with the PL port connected to the line pressure, displacing the trunnions 33, 37 in the tilt axis direction. As the trunnions 33, 37 are displaced in the tilt axis direction, the power rollers 6, 9 are also displaced in the tilt axis direction, which in turn causes the positions of contact between the power rollers 6, 9 and the input disks 4, 7 and output disks 5, 8 to move from those contact positions associated with the trunnion's neutral position. As a result, the power rollers 6, 9 receive a tilt force from both disks and begin to tilt about the tilt axes 11 in a direction and at a speed determined by the direction ($Y>0$ or $Y<0$) along the tilt axes 11 and the amount (absolute value of Y) of the displacement. As the contact points between the both disks and the power rollers change, the speed change is performed continuously.

The combined displacement of the tilt axis direction displacement Y and the tilt angle displacement $\theta$ of the trunnions 33, 37 as detected by the precess cam 53 acts on the other end of the spool 51 of the spool valve 48 through the lever 54 to move the spool 51 against the force of the second spring 52 acting on the one end of the spool 51. Hence, depending on the relation between the position of the sleeve 49 given as a target transmission ratio and the position of the spool 51 given by the precess cam 53, the A port and B port connected to the oil paths 47A, 47B are switched between the PL port and the R port to connect the oil paths 47A, 47B to the PL port or R port to produce a pressure difference between a working oil pressure Pdown in the oil path 47A and a working oil pressure Pup in the oil path 47B. The pressure difference between the working oil pressures of the cylinder chambers 43A and 43B causes the trunnions 33, 37 in the toroidal speed change units 1, 2 to move in the tilt axis direction, starting the speed change operation. As the tilt angle approaches a target tilt angle and the tilt axis direction displacement Y of each trunnion 33, 37 approaches zero, the position of the spool 51 given by the precess cam 53 nears the position of the sleeve 49 corresponding to the target transmission ratio until their positional difference progressively converges to zero, at which time the speed change operation is terminated.

As described above, the tilt angle control of the power rollers 6, 9 is performed so that the spool 51 will follow the sleeve 49 that occupies the position corresponding to the target transmission ratio set by the controller 58. Until the sleeve-following action by the spool 51 is completed, the working oil pressure supplied to the hydraulic cylinders 42, 45 through the open ports is controlled to displace the trunnions 33, 37 in the tilt axis direction. When the tilt axis direction displacement Y of the trunnions 33, 37 is zero and the power rollers 6, 9 are tilted through the target tilt angle, the sleeve-following action by the spool 51 is completed.

There is also a toroidal continuously variable transmission in which the trunnions supporting the power rollers are not displaced even when the power rollers receive a tangential force from the input disk and the output disk during torque transmission (see Japanese Patent Laid-Open No. 151218/1995). This toroidal continuously variable transmission produces a pressure difference between two cylinder chambers-used to control the tilt axis direction displacement of the trunnions-that cancels the tangential force acting on the power rollers to maintain the trunnions at a neutral position and thereby prevent the restarting of the speed change operation after its completion.

The above-described prior arts have the following drawbacks. That is, in the conventional toroidal continuously variable transmissions shown in FIGS. 6 and 7 as examples, the solenoid valves 55A, 55B that control the control oil pressures PA, PB acting on the both ends of the sleeve 49 are normally open duty solenoid valves, a type in which the solenoid valves 55A, 55B produce the pressure of the oil pressure source PS at their output ports C when there is no control signal from the controller 58. It should be noted that the solenoid valves 55A, 55B are not completely free from electric failures and the most likely electric failure is a wire break.

When an electric failure occurs with the solenoid valve 55A, the control oil pressure PA that appears at the SA port of the spool valve 48 is the pressure of the control oil pressure source PS and becomes larger than the control oil pressure PB at the SB port ($PA \geq PB$). Hence, the sleeve 49 is pushed toward the right in FIG. 7 and the working oil pressures to the hydraulic cylinders 42, 45 have the relation of $Pup \geq Pdown$, causing the trunnions to move toward the speed increasing side. When on the other hand an electric failure occurs with the solenoid valve 55B, the control oil pressure PB at the SB port is the pressure of the control oil pressure source PS and becomes larger than the control oil pressure PA at the SA port ($PA \leq PB$). Hence, the working oil pressures to the hydraulic cylinders 42, 45 have the relation of $Pup \leq Pdown$, causing the trunnions to move toward the speed reduction side. When both the solenoid valves 55A, 55B should fail, the SA port and the SB port of the sleeve 49 both produce the pressure of the control oil pressure source PS, fixing the sleeve 49 at the center position and setting the transmission ratio at an intermediate between the maximum speed decrease ratio and the maximum speed increase ratio. Of these electrical failures, the wire break in the solenoid valve 55B causes the toroidal continuously variable transmission to make a rapid shiftdown, resulting in possible engine overruns and vehicle spins, giving rise to a dangerous condition.

As described above, there are problems that need to be solved: when the solenoid valves should electrically fail, a rapid shiftdown of the toroidal continuously variable transmission must be avoided by preventing the speed change operation of the toroidal speed change units from being performed toward the speed reduction side; and a measure to prevent a rapid shiftdown in the event of electric failures, when implemented, must not affect the normal transmission ratio control and must ensure the speed change control is performed stably.

It is an object of this invention to provide a toroidal continuously variable transmission that solves the above problems and in which even when one or both of two solenoid valves that control the position of a sleeve constituting a transmission ratio control valve are failed electrically, the control oil pressures output from the electrically failed solenoid valves to the spool valve are set to other than a pressure that causes the trunnions to move in the tilt axis direction toward the speed reduction side, thereby avoiding a rapid shiftdown of the transmission and preventing occurrence of dangerous conditions such as engine overruns and vehicle spins. It is also an object of this invention to provide a toroidal continuously variable transmission that can prevent a measure, adopted to prevent a rapid shiftdown in the event of such electrical failures, from affecting the normal transmission ratio control and thereby stably maintain the transmission ratio.

DISCLOSURE OF THE INVENTION

The present invention relates to a toroidal continuously variable transmission which comprises an input disk and an output disk, arranged opposite to each other, power rollers disposed between the input disk and the output disk and adapted to continuously change the rotation speed of the input disk according to their tilt angle with respect to the input and output disks and transmit the rotation of the input disk to the output disk, trunnions rotatably supporting the power rollers and arranged to be displaceable in their tilt axis direction, hydraulic cylinders having cylinder chambers for displacing the trunnions in the tilt axis direction, a detection means provided in the trunnions and detecting a combined displacement of a tilt axis direction displacement of the trunnions and a tilt angle displacement of the power rollers, and a transmission ratio control valve to control working oil pressures to the cylinder chambers based on a target transmission ratio to control a transmission ratio, and the combined displacement, wherein the transmission ratio control valve comprises a spool valve for outputting the working oil pressures to the cylinder chambers and solenoid valves for outputting control oil pressures to actuate the spool valve, and, when the solenoid valves are electrically failed, the solenoid valves output such control oil pressures as will cause the spool valve to output the working oil pressures that will shift the transmission ratio toward the speed increasing side.

The toroidal continuously variable transmission of the above construction works as follows. When the solenoid valves are electrically failed as by wire breaks, the solenoid valves output such control oil pressures as will cause the spool valve to output the working oil pressures that will shift the transmission ratio toward the speed increasing side. That is, the working oil pressures output by the spool valve do not displace the trunnions in a direction that will shift the transmission ratio toward the speed reduction side. Hence, even when the car is running at high speed, the toroidal continuously variable transmission is not subjected to a sudden shiftdown. If the toroidal continuously variable transmission shifts up, this represents a load torque increasing side for the engine and thus a safe side for the running car.

The paired solenoid valves output the control oil pressures to the corresponding ends of the spool valve, and one of the solenoid valve is of a normally open type and the other a normally closed type. With this toroidal continuously variable transmission, because the paired solenoid valves are of the opposite types, the normally open and the normally closed, the relative actions on the spool valve performed by the control oil pressures supplied from these solenoid valves are equal, resulting in the same operation of the spool valve, whichever solenoid valve is electrically failed. Hence, the working oil pressures output from the spool valve do not displace the trunnions in a direction that will shift the transmission ratio toward the speed reduction side.

The solenoid valves are duty solenoid valves that can change the control oil pressures according to duty signals. The duty signals supplied to the solenoid valves are made equal. With the duty solenoid valves used for the solenoid valves, the rate of times during which the outputs of the solenoid valves communicate with the oil pressure source and with the drain is controlled based on the duty ratio of the pulse current used to energize the electromagnetic coils, thus changing the control oil pressures. Because this toroidal continuously variable transmission has a pair of different types of solenoid valves, a normally open type and a normally closed type, setting equal the duty signals supplied to these solenoid valves makes the outputs or control oil pressures of the solenoid valves complementary to each other so as to constitute the entire pressure. This is suited for the control of the spool valve.

Further, this invention also relates to a toroidal continuously variable transmission which comprises an input disk and an output disk, arranged opposite to each other, power rollers disposed between the input disk and the output disk and adapted to continuously change the rotation speed of the input disk according to their tilt angle with respect to the input and output disks and transmit the rotation of the input disk to the output disk, trunnions rotatably supporting the power rollers and arranged to be displaceable in their tilt axis direction, hydraulic cylinders having cylinder chambers for displacing the trunnions in the tilt axis direction, a detection means provided in the trunnions and detecting a combined displacement of a tilt axis direction displacement of the trunnions and a tilt angle displacement of the power rollers, and a transmission ratio control valve to control working oil pressures to the cylinder chambers based on a target transmission ratio to control a transmission ratio, and the combined displacement, wherein the transmission ratio control valve comprises a spool valve for outputting the working oil pressures to the cylinder chambers and a pair of duty solenoid valves for outputting control oil pressures to both ends of the spool valve to actuate the spool valve, and one of the duty solenoid valves is of a normally open type and the other is of a normally closed type to set duty signals for the both duty solenoid valves 180 degrees out of phase with each other to cancel variations of the control oil pressures acting on the both ends of the spool valve in order that the duty solenoid valves, when electrically failed, output such control oil pressures as will cause the working oil pressures output from the spool valve to shift the transmission ratio toward the speed increasing side.

The toroidal continuously variable transmission with the above construction performs as follows. When the duty solenoid valves are electrically failed as by wire breaks, the duty solenoid valves output such control oil pressures as will cause the spool valve to output the working oil pressures that will shift the transmission ratio toward the speed increasing side. That is, the working oil pressures output by the spool valve do not displace the trunnions in a direction that will shift the transmission ratio toward the speed reduction side. Hence, even when the car is running at high speed, the toroidal continuously variable transmission is prevented from making a sudden shiftdown. If the toroidal continuously variable transmission shifts up, this represents a load torque increasing side for the engine and thus a safe side for the running car. Because the duty solenoid valves are of a normally open type and a normally closed type and have opposite output characteristics and the duty signals to these valves are set 180 degrees out of phase, the control oil pressures output from the duty solenoid valves are in phase, canceling variations of the control oil pressures acting on the spool valve. As a result, even when the outputs or control oil pressures of the duty solenoid valves are varied, the variations of the working oil pressures output from the spool valve and therefore the variations of the displacement of the trunnions in the tilt axis direction are limited, stabilizing the transmission ratio control.

In the toroidal continuously variable transmission described above, the spool valve has a sleeve slidably fitted in the valve body and a spool slidably fitted in the sleeve to control the working oil pressures according to its relative position with respect to the sleeve. One of the spool and the sleeve is moved according to the combined displacement and the other is moved according to the control oil pressures that were output from the solenoid valves according to a target transmission ratio. When a spool valve having the sleeve and spool described above is used, one of the sleeve and the spool moves so as to match the target transmission ratio and the other also moves following the preceding movement that corresponds to the target transmission ratio. In this way, the speed change control is performed.

The detection means that detects the combined displacement is a precess cam, and one of the spool and the sleeve engages the precess cam and thus is moved according to the combined displacement. The precess cam can detect the combined displacement of a tilt axis direction displacement and a tilt angle displacement. When one of the spool and the sleeve is engaged with the precess cam, the combined displacement detected by the precess cam is converted into the displacement or distance one of the spool and the sleeve moves.

The spool valve has a spool slidably installed in the valve body to control the working oil pressures according to its position in the valve body. The spool moves according to the control oil pressures that were output from the solenoid valves according to the combined displacement and the target transmission ratio. When a spool valve is used which has a spool but no sleeve, the controller outputs to the solenoid valves control signals determined based on the combined displacement and the target transmission ratio, and the solenoid valves then output to the spool valve the control oil pressures corresponding to the control signals. The spool valve supplies the working oil pressures based on the control oil pressures to the hydraulic cylinders to control the tilt axis direction displacement of the trunnions.

The detection means that detects the combined displacement is a precess cam and the control oil pressures are output according to a difference between a voltage value converted from the combined displacement by a potentiometer and a target voltage value corresponding to a target transmission ratio. The precess cam detects the combined displacement of a tilt axis direction displacement and a tilt angle displacement. The combined displacement detected and the target transmission ratio are converted into voltage values, and according to whose differences the solenoid valves output the control oil pressures.

Further, the toroidal continuously variable transmission has a pair of power rollers and also a pair of trunnions and a pair of hydraulic cylinders to match the power roller combination. The toroidal speed change unit should preferably be of a type having a pair of power rollers from the standpoint of dynamic balance. It is obvious that this invention is also applicable to a double cavity type toroidal continuously variable transmission with two toroidal speed change units of the above construction arranged parallelly on the same shaft.

BEST MODE FOR CARRYING OUT THE INVENTION

Figure 1:
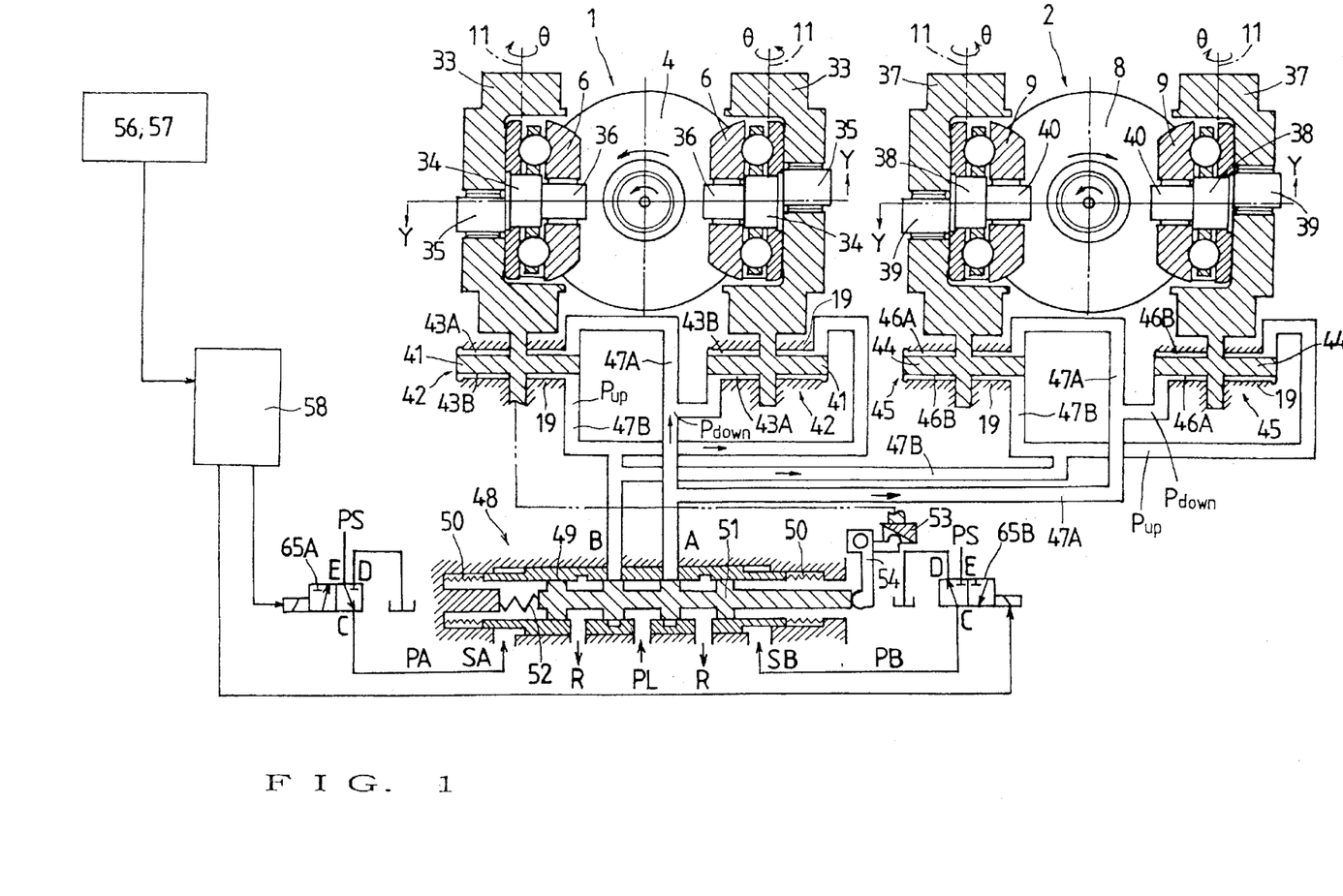
FIG. 1 is a cross section showing a first embodiment of the toroidal continuously variable transmission of the present invention.

Now, by referring to the accompanying drawings, embodiments of the toroidal continuously variable transmission of this invention will be described. The toroidal continuously variable transmission shown in FIG. 1 is identical in basic construction with the conventional toroidal continuously variable transmission shown in FIG. 7, except that particular types of solenoid valves are specified. Thus, similar constitutional elements are assigned like reference numerals, and repetitive explanations on their construction and on the basic transmission ratio control operation based on the identical construction are omitted.

In the toroidal continuously variable transmission of the first embodiment of FIG. 1, a solenoid valve 65A is a normally open duty solenoid valve, and a solenoid valve 65B is a normally closed duty solenoid valve (a "duty solenoid valve" is referred to simply as a "solenoid valve"). In the event that an electric failure such as wire break occurs with the solenoid valve 65A, the output port C communicates with the oil pressure source port E applying the control oil pressure of the control oil pressure source PS to the SA port of the spool valve 48. At this time, if the solenoid valve 65B has no electric failure, the control oil pressure PA at the SA port is higher than the control oil pressure PB at the SB port (PA≧PB), moving the sleeve 49 toward the right in FIG. 1. The PL port communicates with the B port, supplying the line pressure through the oil paths 47B, 47B to the speed increasing side cylinder chambers 43B, 46B. Hence, the working oil pressure relation is Pup≧Pdown and the displacement along the tilt axis of the trunnions 33, 37 is toward a direction that shifts the transmission ratio toward the speed increasing side.

When an electric failure such as wire break occurs with the solenoid valve 65B, the output port C communicates with the drain port D releasing the control oil pressure at the SB port of the spool valve 48 into the drain. At this time if the solenoid valve 65A has no electric failure, the control oil pressure PA at the SA port becomes higher than the control oil pressure PB at the SB port, as when the solenoid valve 65A is electrically failed. Because the sleeve 49 is moved toward the right in FIG. 1, the working oil pressure relation is Pup≧Pdown and the displacement along the tilt axis of the trunnions 33, 37 is toward a direction that shifts the transmission ratio toward the speed increasing side.

When the solenoid valve 65A and the solenoid valve 65B are electrically failed at the same time, the output port C of the solenoid valve 65A communicates with the oil pressure source port E and the output port C of the solenoid valve 65B communicates with the drain port D, so that the control oil pressure PA at the SA port of the spool valve 48 is the pressure of the control oil pressure source PS and the control oil pressure PB at the SB port is the pressure released to the drain. Thus, as when one of the solenoid valves 65A, 65B is electrically failed, the control oil pressure PA at the SA port is higher than the control oil pressure PB at the SB port, causing the sleeve 49 to move toward the right in FIG. 1, which in turn displaces the trunnions 33, 37 in a direction that shifts the transmission ratio toward the speed increasing side.

Figure 3:
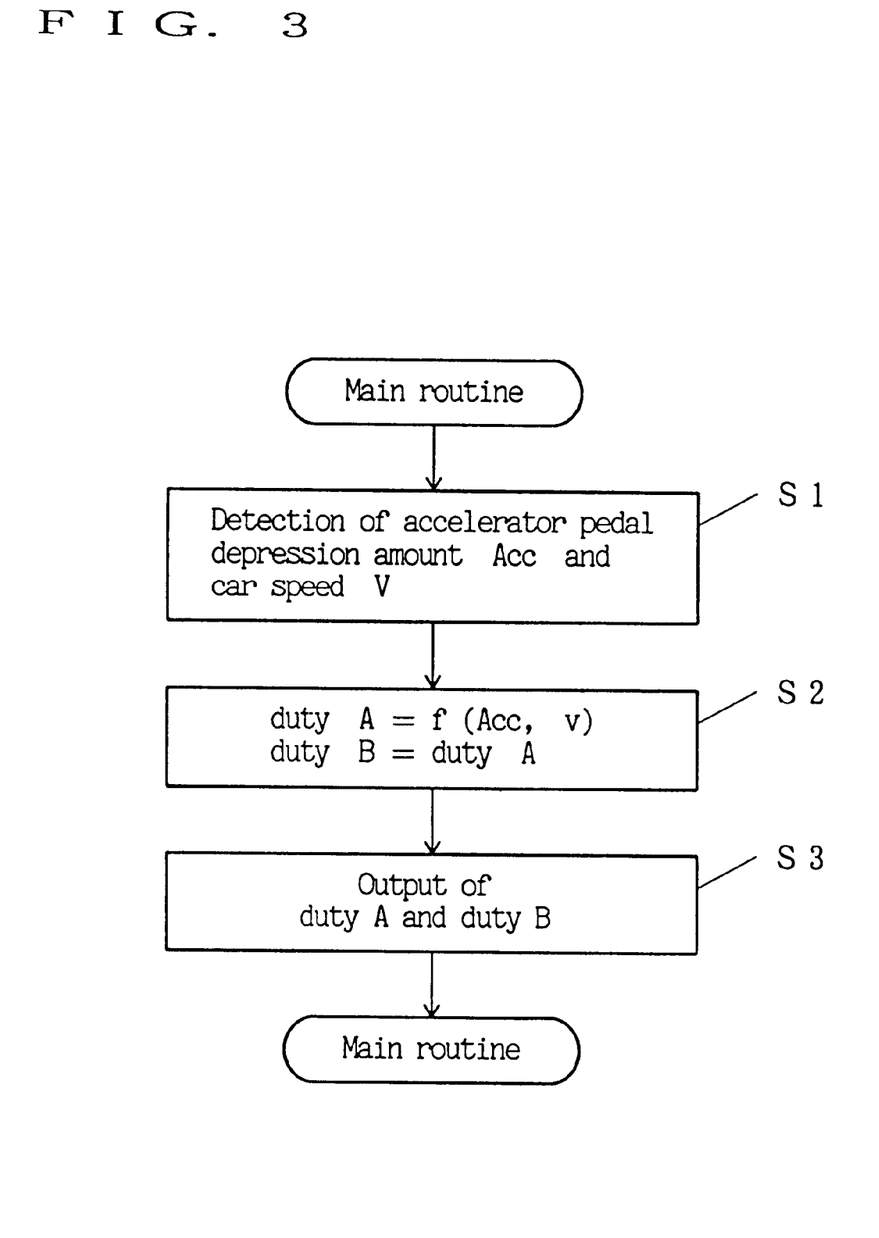
FIG. 3 is a flow chart for determining duties of solenoid valves applied to the toroidal continuously variable transmissions shown in FIGS. 1 and 2.

As described above, the solenoid valve 65A and the solenoid valve 65B are different in type, the former being a normally open type and the latter being a normally closed type. The average degrees at which the output ports of the solenoid valves 65A, 65B are open to the control oil pressure source PS in response to signals (duty signals)-whose duty ratios are determined according to the target transmission ratio—from the controller 58 are complementary to each other. Therefore, the duty signals to activate the solenoid valves 65A, 65B are defined to be the same. That is, as shown in FIG. 3, when the accelerator pedal depression amount Acc and the car speed v are detected (step 1, abbreviated S1: the subsequent steps are similarly abbreviated), the duty A of the solenoid valve 65A is determined according to the target transmission ratio by a function f of the accelerator pedal depression amount Acc and car speed v detected. And the duty B of the solenoid valve 65B is set equal to the duty A (S2). The duty A and duty B thus determined are output to the corresponding solenoid valves 65A, 65B (S3).

Figure 2:
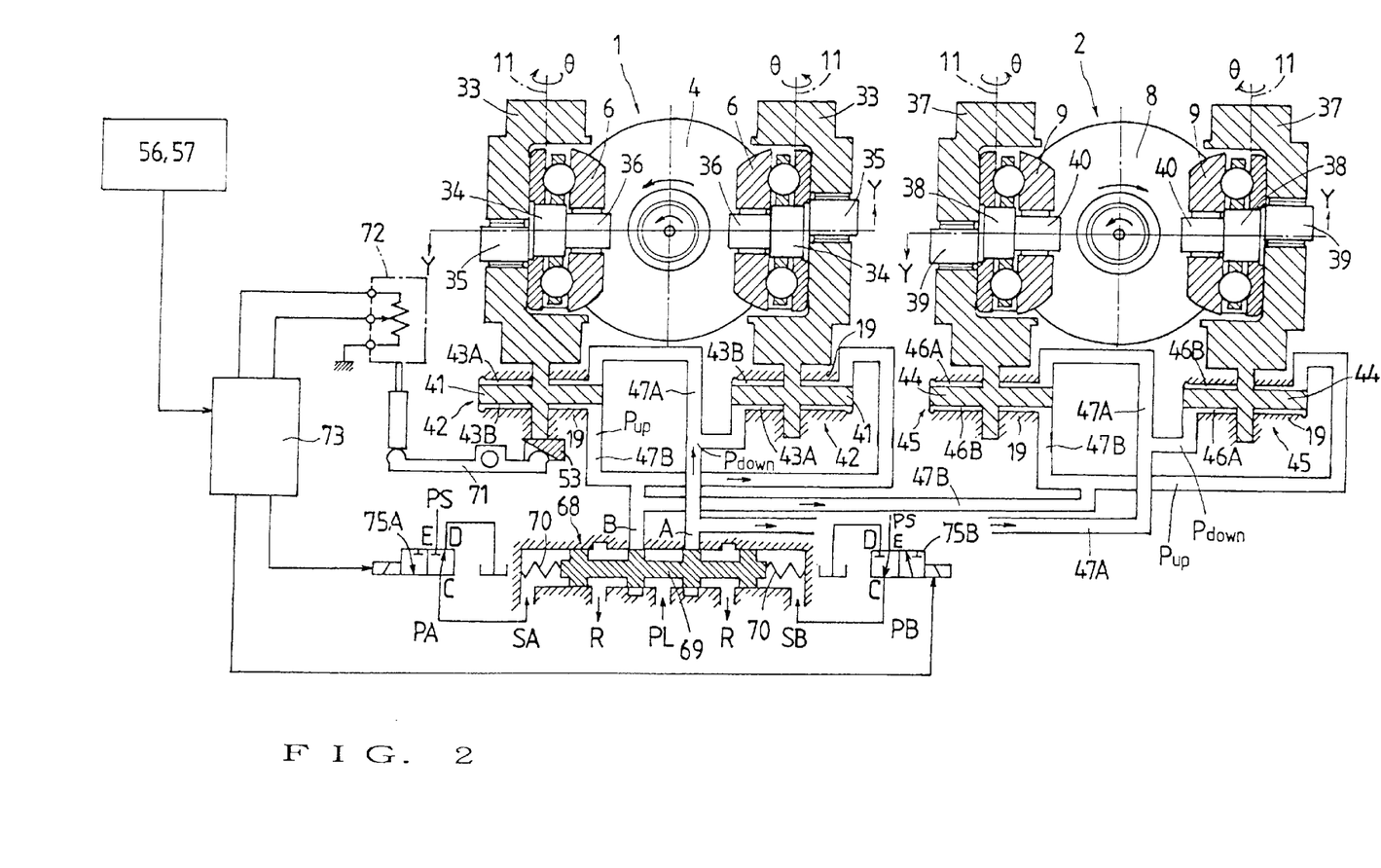
FIG. 2 is a cross section showing a second embodiment of the toroidal continuously variable transmission of the present invention.

Next, referring to FIG. 2, a second embodiment of the toroidal continuously variable transmission of this invention will be described. The toroidal continuously variable transmission shown in FIG. 2 is an example in which a spool valve 68 forming the transmission ratio control valve has no sleeve. Hence, the outputs of solenoid valves 75A, 75B directly act on the ends of the spool 69 of the spool valve 68. The combined displacement of the tilt axis direction displacement Y and the tilt angle displacement θ of the trunnions 33 detected by the precess cam 53 is fed to a potentiometer 72 through a lever 71. The potentiometer 72 converts the combined displacement into a corresponding voltage value V and feeds it to a controller 73. The controller 73 calculates a target transmission ratio based on speed change information such as car speed v and accelerator pedal depression amount Acc received from the car speed sensor 56 and the accelerator depression sensor 57, and determines a target voltage value $V_0$ corresponding to the target transmission ratio by using such a means as a predetermined conversion table. Based on a deviation $V_e$ between the voltage value V and the target voltage value $V_0$, the controller 73 outputs control signals to the solenoid valves 75A, 75B in the form of duty signals, the signals whose duty ratio is varied successively.

The output ports C of the solenoid valves 75A, 75B supply the control oil pressures PA, PB conforming to the respective duties to the SA port and the SB port. The control oil pressures PA, PB supplied to the SA port and SB port are controlled so that the pressure difference between these control oil pressures is proportional to the voltage deviation $V_e$. The spool 69 is moved to left or right in FIG. 2 according to the pressure difference, with the result that the PL port communicates with the A port or B port to connect the oil paths 47A, 47B to the PL port or R port, thus producing a pressure difference between the working oil pressures Pdown and Pup of the oil paths 47B and 47A. The trunnions 33, 37 are displaced in the tilt axis direction according to the pressure differences between the cylinder chambers 43A and 43B and between the cylinder chambers 46A and 46B, thus starting the speed change operation. As the tilt angle θ and the voltage value V approach the target tilt angle and the target voltage value $V_0$, respectively, the tilt axis direction displacements Y of the trunnions 33, 37 come close to zero and the actual transmission ratios also come close to the target transmission ratio. Each time the sign of the voltage deviation $V_e$ reverses, the speed change operation described above is repetitively performed until the actual transmission ratio coincides with the target transmission ratio, at which time the tilt axis direction displacements Y and the deviations $V_e$ of the trunnions 33, 37 are both zero and the power rollers 6, 9 return to the neutral position, terminating the speed change operation.

The solenoid valve 75A is of a normally closed duty solenoid valve (in this embodiment, too, a duty solenoid valve is abbreviated a "solenoid valve"). In the event of an electric failure such as a wire break, the output port C connects to the drain port D to release the control oil pressure PA at the SA port of the spool valve 68. If the solenoid valve 75B has no electric failure, the control oil pressure PA becomes lower than the control oil pressure PB acting on the SB port (PA≦PB), moving the spool 69 of the spool valve 68 to the left in FIG. 2, with the result that the PL port communicates with the B port applying the line pressure as a working oil pressure to the speed increasing side cylinder chambers 43B, 46B of the hydraulic cylinders 42, 45 through the oil path 47B. As a result, the trunnions 33, 37 shift toward the speed increasing side.

The solenoid valve 75B is of a normally open solenoid valve and when an electric failure such as a wire break occurs, the output port C connects to the oil pressure source port E bringing the pressure of the control oil pressure source PS to the control oil pressure PB at the SB port of the spool valve 68. Even if the solenoid valve 75A has no electric failure, the control oil pressure PB acting on the SB port becomes higher than the control oil pressure PA (PA≦PB), moving the spool 69 of the spool valve 68 to the left in FIG. 2. This in turn connects the PL port to the B port supplying the line pressure as the working oil pressure through the oil path 47B to the speed increasing side cylinder chambers 43B, 46B of the hydraulic cylinders 42, 45. As a result the trunnions 33, 37 shift toward the speed increasing side.

When the solenoid valves 75A and 75B should electrically fail at the same time, the control oil pressure PA at the SA port of the spool valve 68 is released and the control oil pressure PB at the SB port is set to the pressure of the control oil pressure source PS. Hence, the control oil pressure PB acting on the SB port becomes higher than the control oil pressure PA (PA≦PB), causing the trunnions 33, 37 to shift toward the speed increasing side, as when one of the solenoid valves 75A, 75B is electrically failed. As to the calculation of duties for the solenoid valves 75A, 75B, because the two solenoid valves are of different types as in FIG. 3, their duties are set equal.

The solenoid valve 65A and the solenoid valve 65B, as described earlier, are different in type, the former being a normally open type and the latter being a normally closed type. Because the solenoid valve 65B is a normally closed type, the waveform of the control oil pressure PB which is the output of the solenoid valve 65B assumes a peak (high) when the solenoid valve is energized and a trough (low) when it is deenergized. Because the solenoid valve 65A is a normally open type, the waveform of the control oil pressure PA which is the output of the solenoid valve 65A assumes a trough (low) when the solenoid valve is energized and a peak (high) when it is deenergized.

Figure 9:
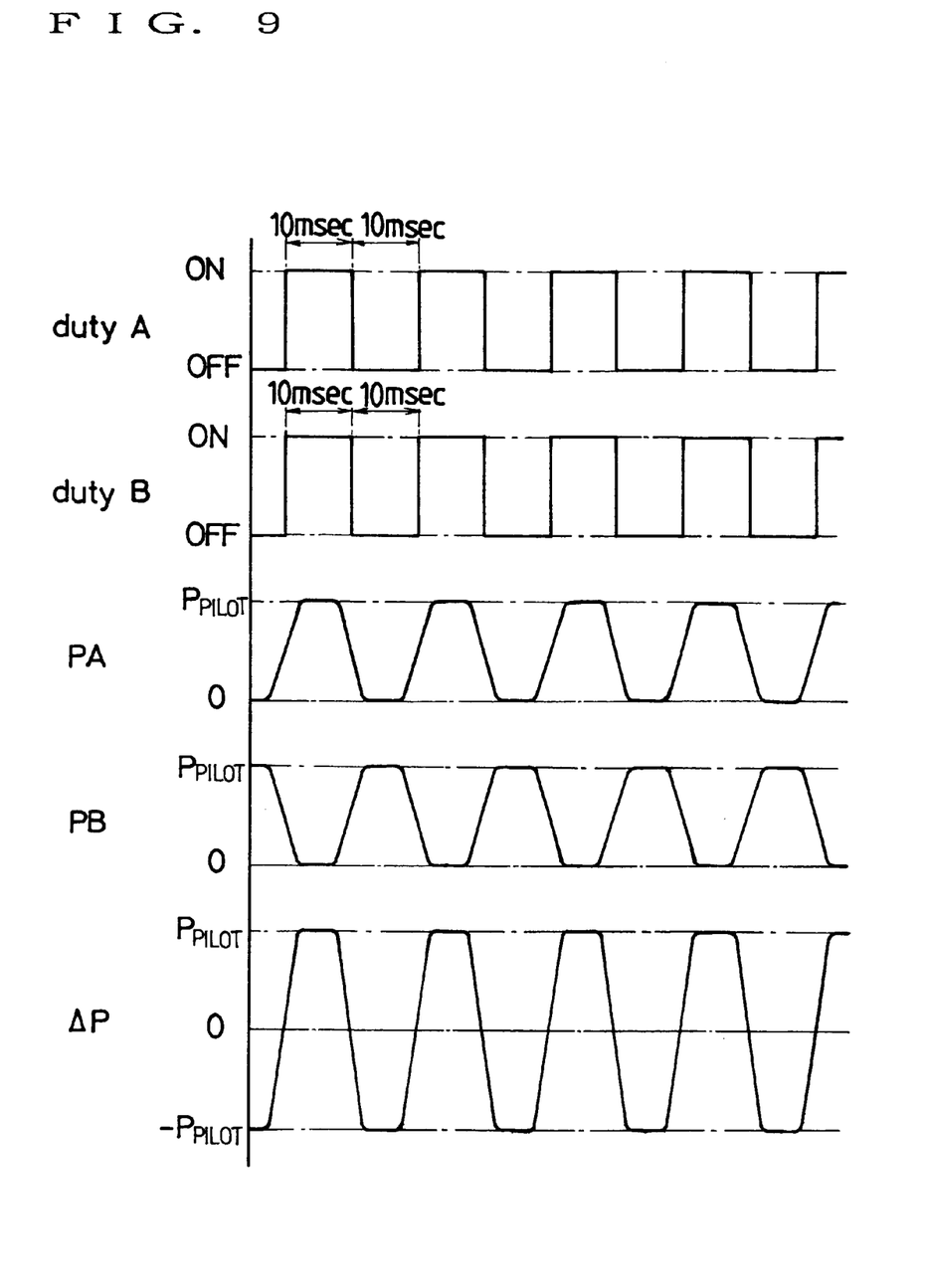
FIG. 9 is a graph showing a relation between input pulses to the duty solenoid valves and control oil pressures in the conventional toroidal continuously variable transmission.

When the types of the two solenoid valves 65A and 65B differ, some improvements need to be made as to the stability of the transmission ratio control, as shown in FIG. 9. FIG. 9 is a graph showing duty signals duty A and duty B, which are control signals to the solenoid valves 55A, 55B, control oil pressures PA, PB that appear at the SA port and SB port of the spool valve 48, and a pressure difference ΔP between the two control oil pressures when the duty A and duty B to the duty solenoid valves 55A, 55B are both 50%. Assuming that the duty signals to the solenoid valves 55A, 55B are in phase, the timings at which the solenoid valves 55A and 55B are energized or deenergized always coincide with each other. If one of the solenoid valves 55A, 55B is made a normally open type and the other a normally closed type, the control oil pressures to the SA port and SB port of the spool valve 48, which are outputs of the solenoid valves 55A, 55B, are 180 degrees out of phase with each other and thus the pressure difference ΔP between the control oil pressures varies periodically over a range of magnitude from $+P_{PILOT}$ to $-P_{PILOT}$, which is two times the pressure $P_{PILOT}$ of the control oil pressure source (pilot oil pressure source). As a result, the operation of the spool valve 48 is unstable making it difficult to maintain the transmission ratio stably.

Figure 4:
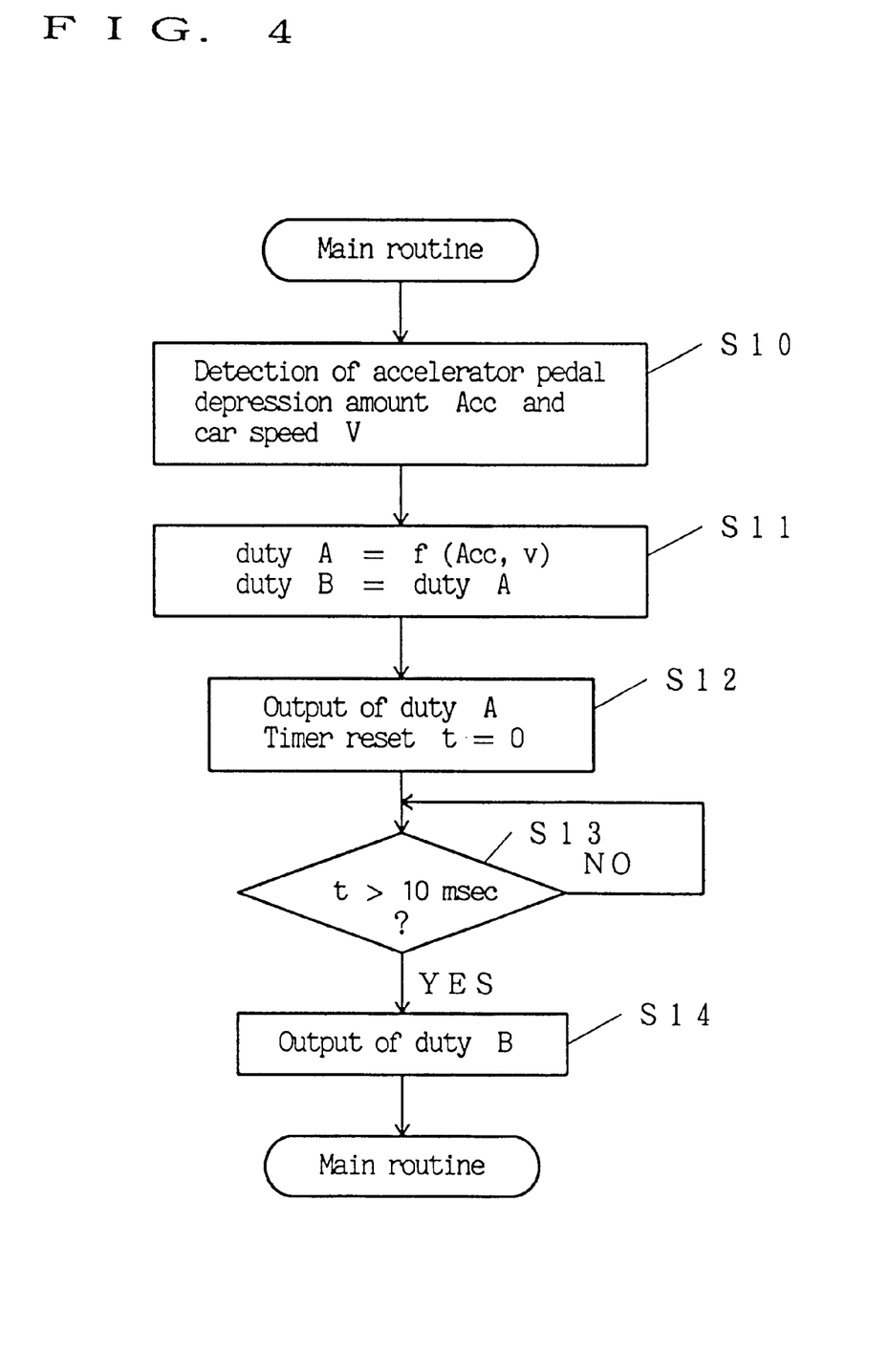
FIG. 4 is another flow chart for determining duties of solenoid valves applied to the toroidal continuously variable transmissions shown in FIGS. 1 and 2.

Therefore, as another form of control performed by the transmission ratio control valve, the toroidal continuously variable transmission of this invention shifts the duty signals for the solenoid valves 65A and 65B 180 degrees out of phase with each other. That is, as shown in the flow chart of FIG. 4, the car speed v and the accelerator pedal depression amount Acc are detected by the car speed sensor 56 and the accelerator depression sensor 57 respectively (S10). Of the duty A and duty B calculated by S11 (similar to S2 in FIG. 3), the duty A is first output to the solenoid valve 65A and at the same time the timer is reset (to time t=0) (S12). It is checked whether the time t after the timer start exceeds 10 msec (S13). 10 msec is equivalent to half the period (20 msec) when the pulse width modulated frequency is 50 Hz. Hence, when the pulse width modulated frequency is changed, this decision time is also changed. If the S13 decides that the time t after the start of the timer has not exceeded 10 msec, the timer operation continues. If it is found that 10 msec is exceeded, the duty B is output to the solenoid valve 65B (S14).

Figure 5:
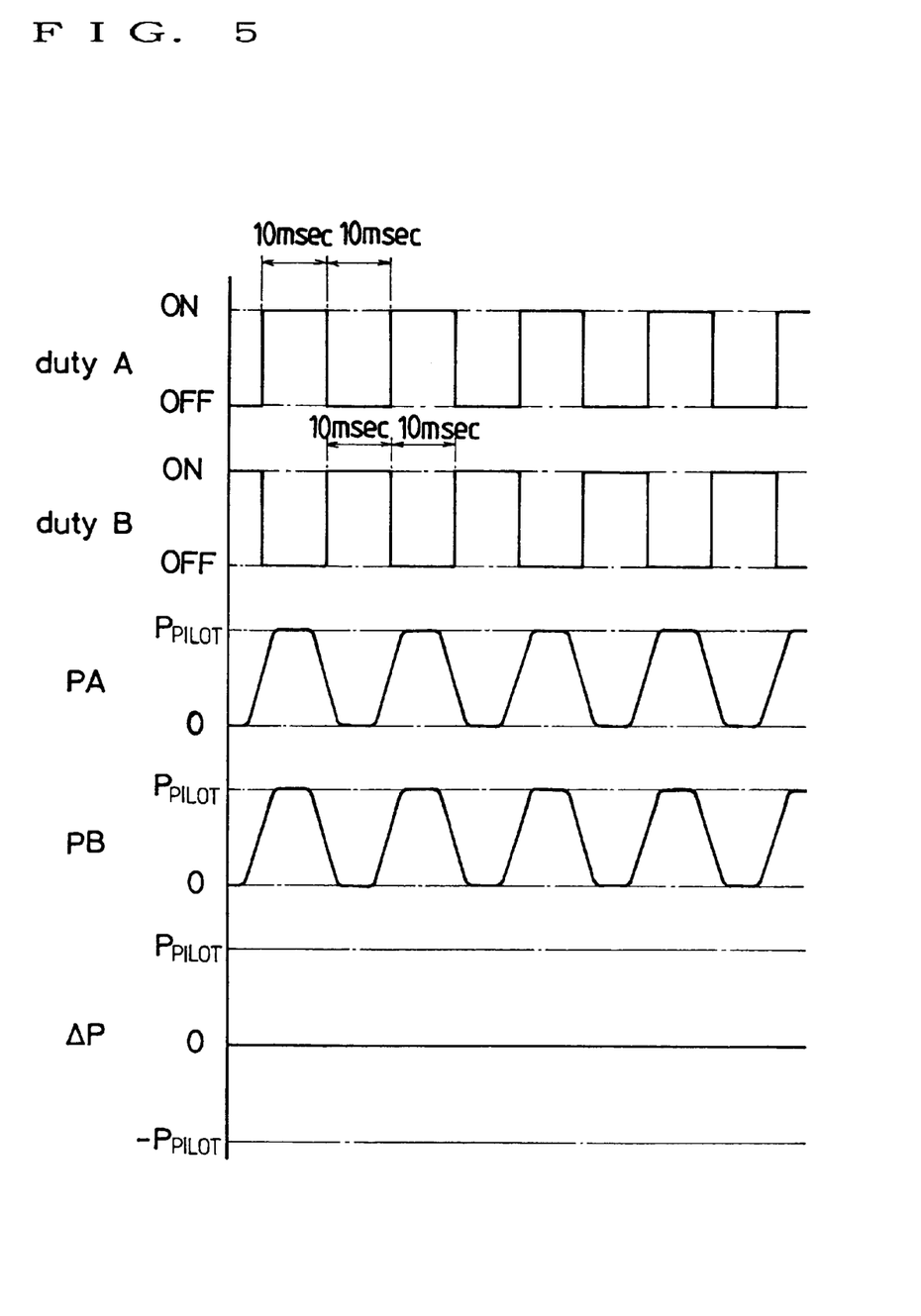
FIG. 5 is a graph showing a relation between input pulses to the duty solenoid valves and control oil pressures in the toroidal continuously variable transmission of this invention.

With this duty control performed, the duty B has its waveform peaks and troughs staggered from those of the duty A, as shown in FIG. 5. However, the control oil pressures PA and PB-the outputs of the solenoid valves 65A and 65B-are in phase, so that the difference ΔP between the control oil pressures PA, PB acting on the spool valve is canceled, stabilizing the position of the sleeve 49 of the spool valve 48 (which corresponds to the target transmission ratio). The working oil pressure supplied to the hydraulic cylinders 42, 45 by the movement of the spool 51 following the sleeve 49 is also stabilized, which in turn stabilizes the transmission ratio.

In the embodiment shown in FIG. 2 also, the control oil pressures PA, PB can be controlled in phase, as described above. The calculation of duties for the solenoid valves 75A, 75B and the shifting of duty A and duty B 180 degrees out of phase are performed in the same way as described with reference to FIGS. 4 and 5. The control oil pressures PA, PB, the outputs of the solenoid valves 75A, 75B, are in phase, which cancels the difference ΔP between the control oil pressures PA, PB acting on the spool 69 of the spool valve. Thus, the working oil pressures Pup, Pdown supplied to the hydraulic cylinders 42, 45 by the movement of the spool 69 are also stabilized, which in turn stabilizes the transmission ratio.

INDUSTRIAL APPLICABILITY

With the toroidal continuously variable transmission of this invention constructed as described above, when the solenoid valves are electrically failed, as by wire breaks, the control oil pressures output from the solenoid valves are such as will cause the spool valve to output the working oil pressure that will shift the transmission ratio toward the speed increasing side. The trunnions are therefore not displaced in a direction that changes the transmission ratio toward the speed reduction side. This prevents a sudden shiftdown of the toroidal continuously variable transmission which would throw the vehicle into a dangerous situation when running at high speed. If the toroidal continuously variable transmission should be shifted up, this tends to increase a load torque for the engine, which is a safe side of the running vehicle.

Further, because the duty signals for a pair of duty solenoid valves of opposite types-normally open and normally closed-are set 180 degrees out of phase with each other, the control oil pressures, the outputs of the duty solenoid valves, are in phase. Hence, the variations of the pressure difference between the control oil pressures acting on the spool valve are canceled, with the result that the working oil pressure output from the spool valve is stabilized assuring a stable control of the transmission ratio.

What is claimed is:

1. A toroidal continuously variable transmission comprising an input disk and an output disk, arranged opposite to each other, power rollers disposed between the input disk and the output disk and adapted to continuously change the rotation speed of the input disk according to a tilt angle of the power rollers with respect to the input and output disks and transmit the rotation of the input disk to the output disk, trunnions rotatably supporting the power rollers arranged to be displaceable in a tilt axis direction of the trunnions to change the tilt angle of the power rollers with respect to the input and output disks, hydraulic cylinders having cylinder chambers for displacing the trunnions in the tilt axis direction, a detection means provided in the trunnions and detecting a combined displacement of a tilt axis direction displacement of the trunnions and a tilt angle displacement of the power rollers, and a transmission ratio control valve to control working oil pressures to the cylinder chambers based on a target transmission ratio and the combined displacement to control a transmission ratio, wherein the transmission ratio control valve comprises a spool valve for outputting the working oil pressures to the cylinder chambers and solenoid valves for outputting control oil pressures to actuate the spool valve, and, the spool valve has a sleeve slidably fitted in a valve body of the spool valve and a spool slidably fitted in the sleeve to control the working oil pressures according to a relative position of the spool with respect to the sleeve, one of the spool and the sleeve moving according to the combined displacement, and the other of the spool and the sleeve moving according to the control oil pressures output from the solenoid valves based on the target transmission ratio, and the spool valve outputs the working oil pressures that will shift the transmission ratio toward the speed increasing side owing to movement of the other of the spool and the sleeve in response to the control oil pressures which the solenoid valves output when the solenoid valves electrically fail.

2. A toroidal continuously variable transmission according to claim 1, wherein the ends of the spool valve are supplied with the control oil pressures output from the paired solenoid valves, one of the solenoid valves being a normally open solenoid valve and the other being a normally closed solenoid valve.

3. A toroidal continuously variable transmission according to claim 2, wherein the solenoid valves are duty solenoid valves that can change the control oil pressures according to duty signals, and the duty signals fed to both the solenoid valves are set equal.

4. A toroidal continuously variable transmission according to claim 1, wherein the detection means to detect the combined displacement is a precess cam, and, when the one of the spool and the sleeve engages the precess cam, it is moved according to the combined displacement.

5. A toroidal continuously variable transmission comprising an input disk and an output disk, arranged opposite to each other, power rollers disposed between the input disk and the output disk and adapted to continuously change the rotation speed of the input disk according to a tilt angle of the power rollers with respect to the input and output disks and transmit the rotation of the input disk to the output disk, trunnions rotatably supporting the power rollers and arranged to be displaceable in a tilt axis direction of the trunnions to change the tilt angle of the power rollers with respect to the input and output disks, hydraulic cylinders having cylinder chambers for displacing the trunnions in the tilt axis direction, a detection means provided in the trunnions and detecting a combined displacement of a tilt axis direction displacement of the trunnions and a tilt angle displacement of the power rollers, and a transmission ratio control valve to control working oil pressures to the cylinder chambers based on a target transmission ratio and the combined displacement to control a transmission ratio, wherein the transmission ratio control valve comprises a spool valve for outputting the working oil pressures to the cylinder chambers and solenoid valves for outputting control oil pressures to actuate the spool valve, and the spool valve has a spool slidably installed in a valve body to control the working oil pressures according to a position of the spool in the valve body, and the spool is moved according to the control oil pressures output from the solenoid valves based on the combined displacement and the target transmission ratio, and the spool valve outputs the working oil pressures that will shift the transmission ratio toward the speed increasing side owing to the movement of the spool in response to the control oil pressures which the solenoid valves output when the solenoid valves electrically fail.

6. A toroidal continuously variable transmission according to claim 5, wherein the ends of the spool valve are supplied with the control oil pressures output from the paired solenoid valves, one of the solenoid valves being a normally open solenoid valve and the other being a normally closed solenoid valve.

7. A toroidal continuously variable transmission according to claim 6, wherein the solenoid valves are duty solenoid valves that can change the control oil pressures according to duty signals, and the duty signals fed to both the solenoid valves are set equal.

8. A toroidal continuously variable transmission according to claim 5, wherein the detection means to detect the combined displacement is a precess cam and the control oil pressures are output according to a difference between a voltage value converted from the combined displacement by a potentiometer and a target voltage value corresponding to a target transmission ratio.

9. A toroidal continuously variable transmission comprising an input disk and an output disk, arranged opposite to each other, power rollers disposed between the input disk and the output disk and adapted to continuously change the rotation speed of the input disk according to a tilt angle of the power rollers with respect to the input and output disks and transmit the rotation of the input disk to the output disk, trunnions rotatably supporting the power rollers and arranged to be displaceable in a tilt axis direction to change the tilt angle of the power rollers with respect to the input and output disks, hydraulic cylinders having cylinder chambers for displacing the trunnions in the tilt axis direction, a detection means provided in the trunnions for detecting a combined displacement of a tilt axis direction displacement of the trunnions and a tilt angle displacement of the power rollers, and a transmission ratio control valve to control working oil pressure to the cylinder chambers based on a target transmission ratio and the combined displacement to control a transmission ratio, wherein the transmission ratio control valve comprises a spool valve for outputting the working oil pressures to the cylinder chambers and a pair of duty solenoid valves for outputting control oil pressure to both ends of the spool valve to actuate the spool valve, and the spool valve having a sleeve slidably fitted in a valve body of the spool valve and a spool slidably fitted in the sleeve to control the working oil pressures according to a relative position of the spool with respect to the sleeve, one of the spool and the sleeve being moved according to the combined displacement, and the other of the spool and sleeve being moved according to the control oil pressures output from the duty solenoid valves based on the target transmission ratio, and one of the duty solenoid valves being of a normally open type and the other being of a normally closed type to set duty signals for both the duty solenoid valves 180 degrees out of phase with each other to cancel variations of the control oil pressures acting on both the ends of the spool valve, and the spool valve outputs the working oil pressures that will shift the transmission ratio toward the speed increasing side owing to the move of the other of the spool and the sleeve in response to the control oil pressures which the duty solenoid valves output when the duty solenoid valves electrically fail.

10. A toroidal continuously variable transmission according to claim 9, wherein the detection means to detect the combined displacement is a precess cam, and, when the one of the spool and the sleeve engages the precess cam, the precess cam is moved according to the combined displacement.

11. A toroidal continuously variable transmission comprising an input disk and an output disk, arranged opposite to each other, powers rollers disposed between the input disk and the output disk and adapted to continuously change the rotation speed of the input disk according to a tilt angle of the power rollers with respect to the input output disks and transmit the rotation of the input disk to the output disk, trunnions rotatably supporting the power rollers and arranged to be displaceable in a tilt axis direction of the trunnions to change the tilt angle of the power rollers with respect to the input and output disks, hydraulic cylinders having cylinder chambers for displacing the trunnions in the tilt axis direction, a detection means provided in the trunnion and detecting a combined displacement of a tilt axis direction displacement of the trunnions and a tilt angle displacement of the power rollers, and a transmission ratio control valve to control working oil pressures to the cylinder chambers based on a target transmission ratio and the combined displacement to control a transmission ratio, wherein the transmission ratio control valve comprises a spool valve for outputting the working oil pressures to the cylinder chambers and a pair of duty solenoid valves for outputting control oil pressures to both ends of the spool valve to actuate the spool valve, and the spool valve has a spool slidably installed in a valve body to control the working oil pressures according to a position of the spool in the valve body, and the spool is moved according to the control oil pressures output from the duty solenoid valves based on the combined displacement and the target transmission ratio, one of the duty solenoid valves being of a normally open type and the other being of a normally closed type to set duty signals for the both duty solenoid valves 180 degrees out of phase with each other to cancel variations of the control oil pressures acting on the both ends of the spool valve, and the spool valve outputs the working oil pressures that will shift the transmission ratio toward the speed increasing side owing to the movement of the spool in response to the control oil pressures which the duty solenoid valves output when the duty solenoid valves electrically fail.

12. A toroidal continuously variable transmission according to claim 11, wherein the detection means to detect the combined displacement is a precess cam and the duty signals are signals that correspond to a difference between a voltage value converted from the combined displacement by a potentiometer and a target voltage value corresponding to a target transmission ratio.

* * * * *